United States Patent [19]

Satake

[11] Patent Number: 5,038,788

[45] Date of Patent: Aug. 13, 1991

[54] ULTRASONIC DOPPLER DIAGNOSIS APPARATUS

[75] Inventor: Nozomi Satake, Nishinasunomachi, Japan

[73] Assignee: Kabushiki Kaisha Toshiba, Kawasaki, Japan

[21] Appl. No.: 505,662

[22] Filed: Apr. 3, 1990

[30] Foreign Application Priority Data

Apr. 5, 1989 [JP] Japan .................... 1-86635

[51] Int. Cl.⁵ .............................................. A61B 8/06
[52] U.S. Cl. ............................ 128/661.09; 73/861.25
[58] Field of Search ........... 128/660.05, 661.07–661.1; 73/861.25

[56] References Cited

U.S. PATENT DOCUMENTS

| 4,373,533 | 2/1983 | Iinuma .............................. 128/661.1 |
| 4,416,286 | 11/1983 | Iinuma et al. .................. 128/661.09 |
| 4,501,277 | 2/1985 | Hongo .......................... 128/661.09 X |
| 4,622,978 | 11/1986 | Matsuo et al. .................. 128/660.05 |
| 4,630,612 | 12/1986 | Uchida et al. ............. 128/661.09 X |
| 4,790,322 | 12/1988 | Iinuma .............................. 128/661.1 |
| 4,817,619 | 4/1989 | Sugiyama et al. ............. 128/661.09 |
| 4,873,985 | 10/1989 | Nakajima ..................... 128/661.1 X |
| 4,937,797 | 6/1990 | Snyder et al. ............. 128/661.08 X |
| 4,972,838 | 11/1990 | Yamazaki .................. 128/660.05 X |

FOREIGN PATENT DOCUMENTS 61-22576 2/1986 Japan .

*Primary Examiner*—Francis Jaworski
*Attorney, Agent, or Firm*—Finnegan, Henderson, Farabow, Garrett, and Dunner

[57] ABSTRACT

An ultrasonic Doppler diagnosis apparatus sets first and second rasters on a single blood stream. Those rasters originate from a single ultrasonic beam origin and extend in two different directions. An electronic sector scanner sets sample volumes of substantially equal depths as measured from the surface of a human body, on those rasters. A Doppler signal detector detects two types of Doppler shift signals corresponding to the sample volumes. An angle calculating circuit calculates an angle $\theta$ by using the coordinates data of the sample volumes, and obtains the information on the velocity of blood stream.

4 Claims, 6 Drawing Sheets

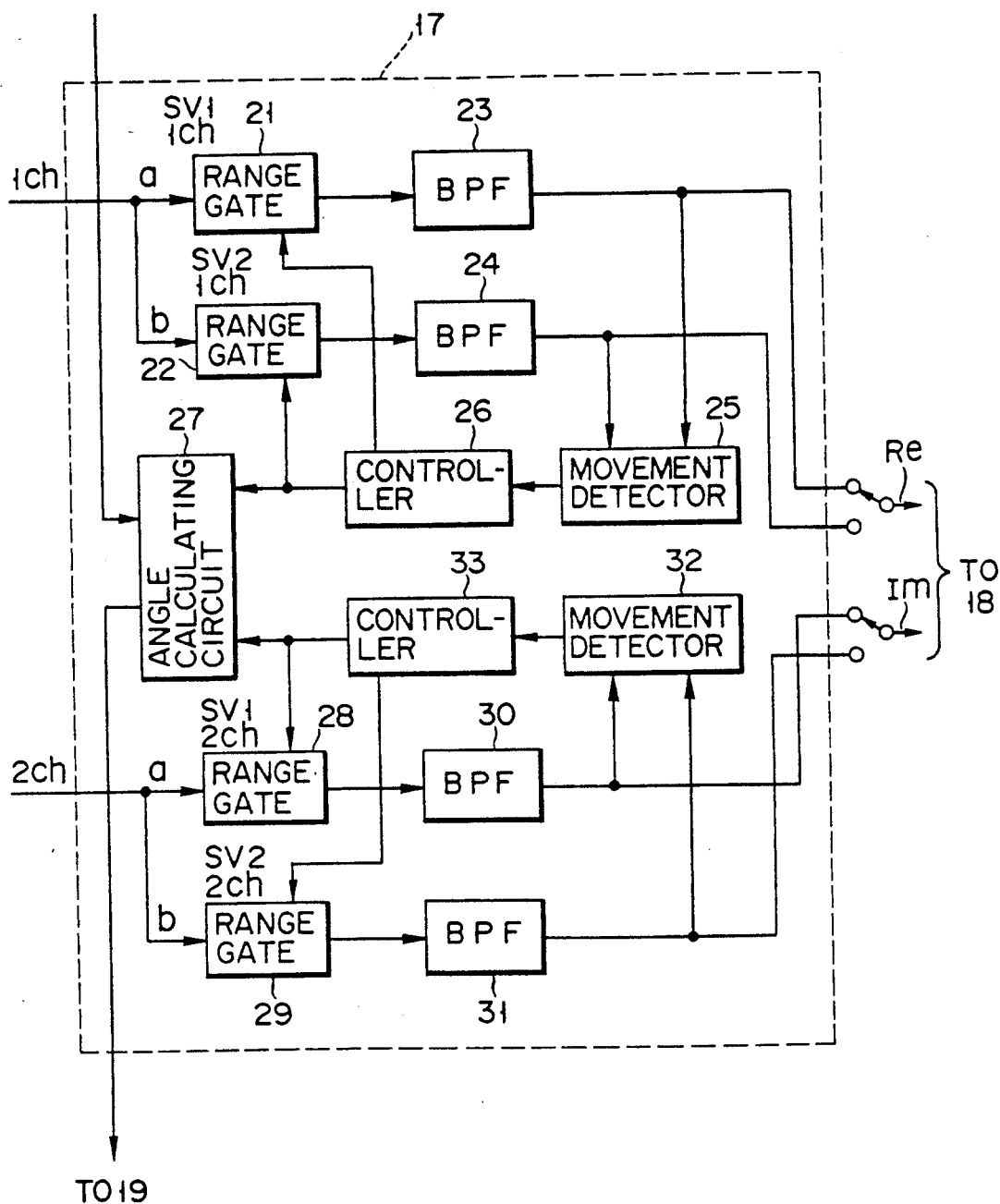
F I G. 4

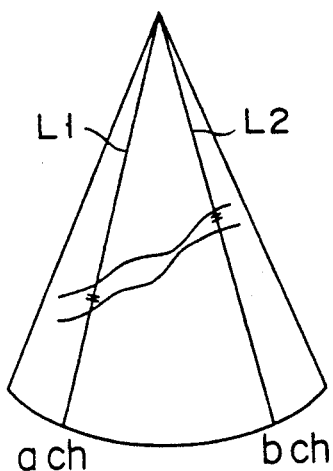
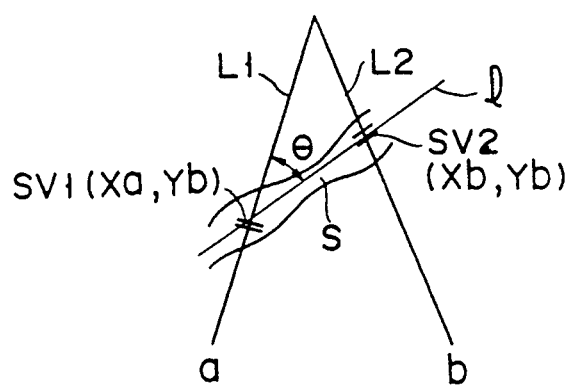
FIG. 6       FIG. 7
FIG. 8A
FIG. 8B
FIG. 8C
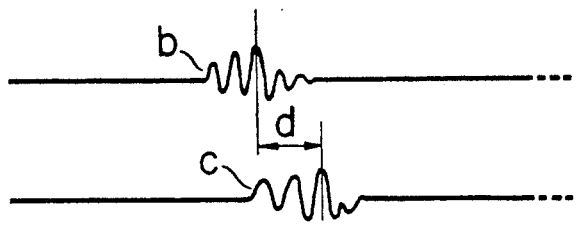

ULTRASONIC DOPPLER DIAGNOSIS APPARATUS

BACKGROUND OF THE INVENTION

1. Field of the Invention

The present invention relates to improvements of an ultrasonic Doppler diagnosis apparatus.

2. Description of the Related Art

There has been known an ultrasonic Doppler diagnosis apparatus based on the combination of an ultrasonic Doppler method and an ultrasonic pulse reflecting method. In the apparatus, information on blood stream and information on tomogram (B-mode image) are collected by a single ultrasonic probe, and are concurrently displayed in a real time manner. The principles to measure a blood velocity by the diagnosis apparatus of this type will be described below.

When an ultrasonic beam is projected onto a blood stream flowing through a human body as an object to be diagnosed, the ultrasonic beam is scattered by blood corpuscles and its center frequency "fc" is Doppler shifted by a frequency "fd". Accordingly, a receiving frequency "f" is the sum of the frequencies "fc" and "fd"; $f = fc + fd$. Those frequencies are mathematically expressed by $$fd = (2V \cos \theta / C) \times fc \tag{1}$$

where
V: Blood velocity
$\theta$: Angle between an ultrasonic beam and blood stream
C: sonic velocity Arranging the formula (1) for the blood velocity V, we have $$V = Cfd/(2fc \cos \theta) \tag{2}$$

The formula (2) teaches that a blood velocity may be obtained by measuring the Doppler shift frequency "fd".

An exemplary display of the combination of blood stream information and a tomogram as obtained by a prior ultrasonic Doppler diagnosis apparatus based on the above principles, is shown in FIG. 1. As shown, blood stream information D as collected by the ultrasonic Doppler method and a sector tomogram B as obtained by the ultrasonic wave reflecting method are concurrently displayed on a monitor. In the display of the blood stream information D, the ordinate represents velocity of a blood stream, and the abscissa represents time. The tomogram B contains a blood stream S, a raster L as an ultrasonic beam, which intersects the blood stream S in an appropriate direction, a sample volume SV (range gate mark) located at the intersection of the blood stream S and the raster L, and an angle mark R rotatable about a central point C of the sample volume SV. The angle mark R may be rotated about the central point C by a desired angle $\theta$ by turning a rotary encoder installed on a console of the diagnosis apparatus. To set the angle $\theta$ of the angle mark R, an operator approximately estimates the direction of the blood stream S, and turns the angle mark so that it coincides with the estimated direction. The diagnosis apparatus is provided with such a function that when the rotary encoder is manually turned, the angle mark R turns in synchronism with the turn of the encoder, and the angle $\theta$ of the angle mark R is automatically calculated. Additionally, the apparatus substitutes a figure of the angle as calculated for the $\theta$ in the formula (2), calculates the formula to obtain a velocity of a blood stream, and finally displays the velocity of the blood stream.

As described above, in the ultrasonic Doppler diagnosis apparatus, to set the angle $\theta$, an operator carefully observes a tomogram on the monitor, and manually turns the angle mark R so as to coincide with the direction of a blood stream. Accordingly, the operations to set the angle $\theta$ are intricate. The plane of the layer of a body for obtaining a Doppler shift signal is not always coincident with that for obtaining a B mode. Accordingly, in the resultant image, run of a blood vessel and the wall of a vessel are not exact. The estimation of the direction of a blood stream on the basis of such an image possibility contains an error. Further, since the direction of a blood stream is manually set, there is a limit in improving an accuracy of detecting information on the blood stream.

The ultrasonic Doppler diagnosis apparatus as mentioned above is described in Japanese Patent Disclosure (No. 61-22576) and U.S. Pat. No. 4,416,286.

SUMMARY OF THE INVENTION

Accordingly, an object of the present invention is to provide an ultrasonic Doppler diagnosis apparatus which is improved in an accuracy of detecting blood stream information, is capable of automatically obtaining an angle between an ultrasonic beam and a blood stream, and is operable in a simple manner.

To achieve the above object, there is provided an ultrasonic Doppler diagnosis apparatus comprising: raster setting means for setting addresses of ultrasonic rasters oriented in arbitrary directions on an image of a blood stream of an object to be diagnosed, the addresses defining first and second rasters by arbitrary angles, and the ultrasonic rasters being obtained by an ultrasonic probe for transmitting and receiving an ultrasonic beam to and from the object; means for setting positions of sample volumes respectively corresponding to depths as measured from the surface of the object on the first and second rasters as set by the raster setting means; Doppler shift signal detecting means for detecting two types of Doppler shift signals respectively corresponding to the positions of the sample volumes as set on the first and second rasters; and angle detecting means for automatically detecting an angle between a line connecting the positions of the sample volumes as the first and second rasters and one of the first and second rasters on the blood stream image, in order to obtain information on a blood stream.

The ultrasonic Doppler diagnosis apparatus according to the present invention thus arranged displays different rasters on a blood stream, and constantly tracks the sample volumes on the rasters in an automatic manner. Accordingly, an angle between the blood stream and the raster may be detected in a simple manner. Further, if the angle changes, the apparatus detects the change and automatically corrects it.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrates presently preferred embodiments of the invention and, together with the general description given above and the detailed description of the preferred embodiments given below, serve to explain the principles of the invention.

FIG. 4 is a block diagram showing the details of a Doppler signal detector of the circuit arrangement of FIG. 3;

FIG. 6 is a diagram showing a tomogram in which first and second rasters are displayed on a single blood stream;

FIG. 7 shows a diagram for explaining an operation to detect an angle $\theta$ between an ultrasonic beam and a blood stream on the tomogram of FIG. 6;

FIGS. 8A to 8C are a set of waveforms for explaining different detect positions among a rate pulse signal "a", and Doppler shift signals "b" and "c";

DETAILED DESCRIPTION OF THE PREFERRED EMBODIMENTS

An embodiment according to the present invention will be described with reference to the accompanying drawings.

Figure 3:
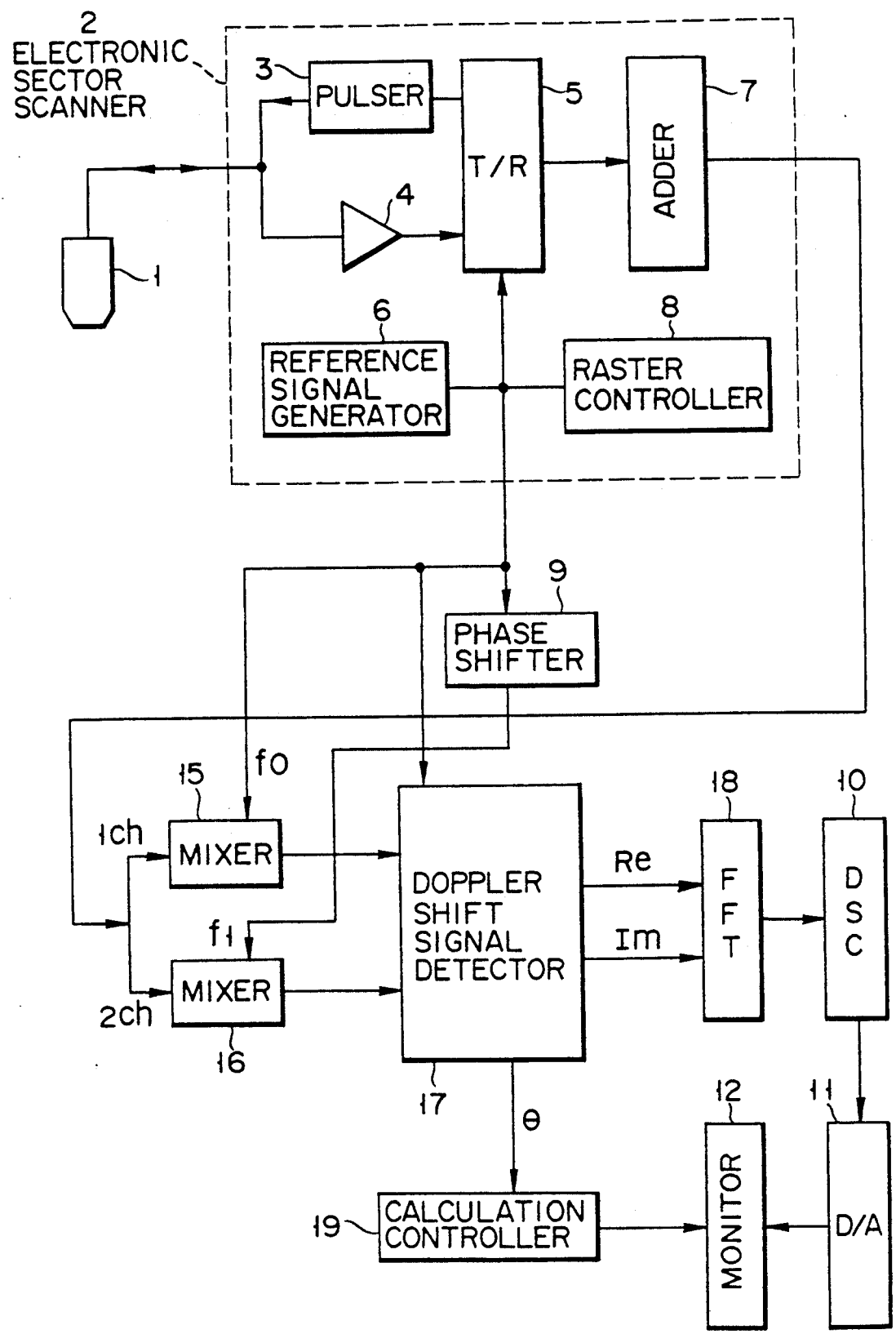
FIG. 3 is a block diagram showing an arrangement of an ultrasonic Doppler diagnosis apparatus according to an embodiment of the present invention.
Figure 9:
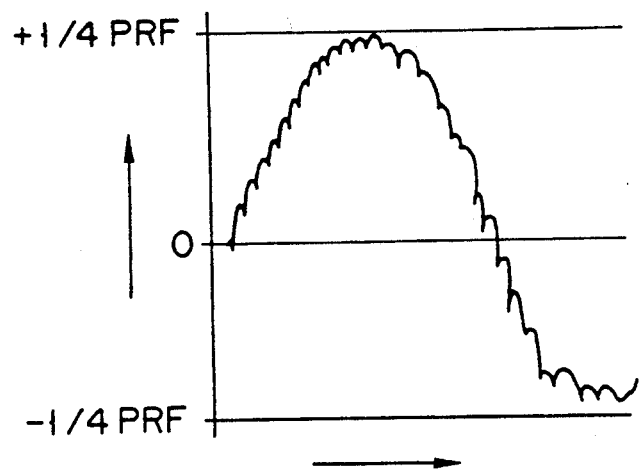
FIG. 9 is a graph showing a range of a pulse repetition frequency of a rate signal to determine a detecting range of a blood stream.

FIG. 3 is a block diagram showing an arrangement of an ultrasonic Doppler diagnosis apparatus according to an embodiment of the present invention. In the figure, reference numeral 1 designates an ultrasonic probe for transmitting an ultrasonic beam to an object to be diagnosed and receiving the ultrasonic beam reflected from the object; numeral 6, a reference signal generator for generating a reference signal to drive the probe to emit an ultrasonic beam; 8, a raster controller for controlling an ultrasonic raster (indicates an ultrasonic beam, and referred to as a raster) to be transmitted and received by the probe 1; 5, a transmit/receive circuit including a delay circuit for delaying an ultrasonic beam that is transmitted and received under control of the reference signal generator 6 and the raster controller 8; 3, a pulser for driving the probe 1; 4, an amplifier for amplifying an echo signal; and 7, an adder for arranging all of the echo signals in phase and adding together them. Reference numeral 2 represents an electronic sector scanner consisting of the circuit components as mentioned above.

An echo signal derived from the adder 7 is shunted into two channel, 1 channel and 2 channel, which are applied to mixers 15 and 16, respectively. The mixer 15 is also coupled for reception with a reference signal "fo" from the reference signal generator 6. The mixer 16 is coupled for reception with another reference signal f1 from a phase shifter 9, whose phase is different by 90° from that of the reference signal "fo". The mixer 15 mixes the 1 channel signal with the reference signal "fo", removes the frequency component (2fo+fd) by a filter (not shown), and produces a phase detect signal containing blood stream information "fd". Similarly, the mixer 16 mixes the 2 channel signal with the reference signal f1, removes the above frequency component, and produces another phase detect signal containing blood stream information. Those phase detect signals are applied to a Doppler shift signal detector 17 where those are subjected to a desired processing.

Figure 1:
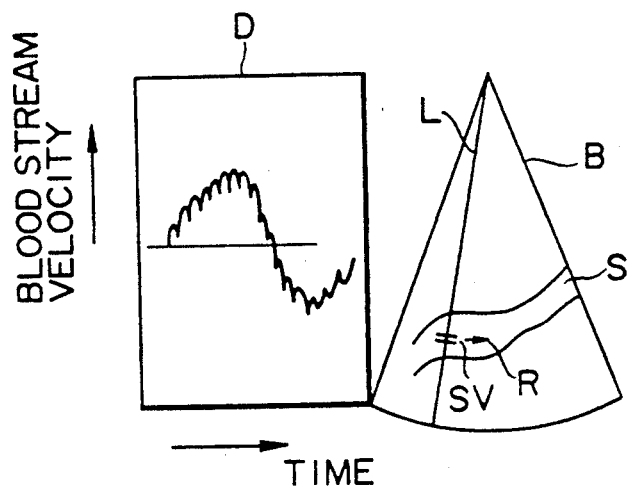
FIG. 1 shows an example of a display including blood stream information and a tomogram that is made by an ultrasonic Doppler diagnosis apparatus of prior art.
Figure 2:
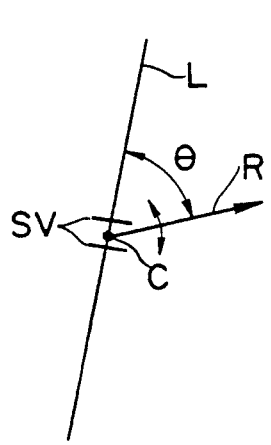
FIG. 2 shows an enlarge view of a part of the display of FIG. 1, which is useful in explaining the operation to set an angle between an ultrasonic beam and a blood stream.
Figure 5:
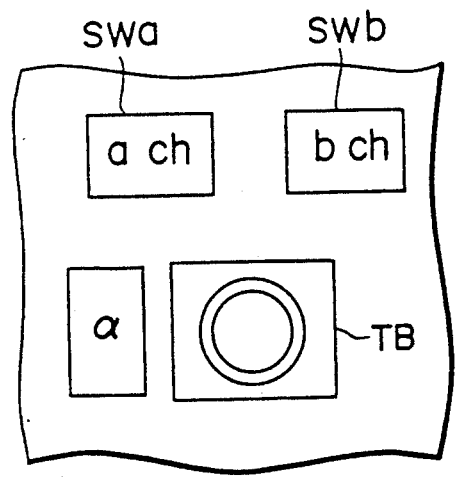
FIG. 5 is a plan view showing a part of a console of the diagnosis apparatus according to the present invention.

The Doppler shift signal detector 17 is shown in detail in FIG. 4. As shown, the detector 17 is provided with a pair of signal systems, channel "a" and channel "b", for the 1 channel signal and another pair of signal systems, channel "a" and channel "b", for the channel 2 signal. The 1 channel signal is shunted into the first pair of signal systems, the channels "a" and "b", which respectively correspond to sample volumes SV1 and SV2 defined in first and second rasters L1 and L2. The channels "a" and "b" function against echo signals on different rasters, respectively. The channel "a" and "b" include range gates 21 and 22 (28 and 29) and BPF (band-pass filters) 23 and 24 (30 and 31). Those ranges gates set those channels "a" and "b" on specific positions on a blood stream by sample volumes SV1 and SV2 on a monitor screen, as shown in FIG. 7. The Doppler shift signals of depths as measured along the plane of a layer of a human body from the surface of the body and determined by the sample volumes SV1 and SV2, are allowed to pass through the BPFs. As shown in FIG. 5, a console of the diagnosis apparatus includes a switch SWa for the channel "a", another switch SWb for the channel "b", and a track ball TB for set the sample volume at a desired direction and depth. By selectively operating the switches SWa and SWb, corresponding rasters L1 and L2 are displayed on a single blood stream, as shown in FIGS. 6 and 7. By operating the track ball TB, the sample volumes SV1 and SV2 are set, as shown. Once the sample volumes SV1 and SV2 are set, the coordinates (Xa, Yb) and (Xb, Yb) on the rasters L1 and L2 are determined (FIG. 7). Accordingly, a line "l" representing a direction of the blood stream is determined, and consequently an angle $\theta$ between the raster L1 and the line "l" is determined.

The output signals of the BPFs 23 and 24 (30, 31) are applied to a FFT (fast Fourier transformer) 18, and fed back to a movement detector 25 (32). There is a case that a detect position of a blood stream signal (containing a Doppler shift signal, a wall signal, and the like) is shifted from a position as shown in FIG. 8B to another position as shown in FIG. 8C, viz., by a distance "d". The movement detector 25 (32) traces this change of position and detects it, and may be constructed by using a known automatic tracking technique. FIG. 8A shows a rate pulse (PRF).

When a change of the detect position of the blood stream, viz., the direction of the blood stream, is detected, the result of the detection is applied to a controller 26 (33). The controller 26 (33) causes the range gates 21 and 22 (28, 29) to set the sample volumes SV1 and SV2 at depths corresponding a new direction of a blood stream, and applies the detect results to an angle calculating circuit 27. The circuit 27 calculates an angle by using the data of the coordinates of the sample volumes SV1 and SV2, and transfers the result of the calculation to a calculation controller 19. Upon detection of the angle $\theta$, the calculation controller 19 calculates a velocity "v" of the blood stream by using the Doppler shift frequency fd in the formula (2), and causes a monitor 12 to display the blood stream velocity. A sequence of the control operations by the Doppler shift signal detector 17 as mentioned above is correspondingly applied to the echo signals of 1 channel and 2 channel as inputted.

The FFT 18 shown in FIG. 3 frequency analyzes the Doppler shift signals every time the positions of the sample volumes SV1 and SV2 on the rasters L1 and L2, which respectively correspond to the two channels "a" and "b". Then, it transfers the result of the frequency analysis to a DSC (digital scan converter) 10. In turn, the DSC converts its scan system, and transfers it through a D/A converter 11 to a monitor 12.

An operation of the above embodiment will be described.

An echo signal as received by the electronic sector scanner 2 is shunted into two channels, 1 channel and 2 channel, in order to detect blood stream information in the forward and reverse directions. Those signals are phased detected, to produce signal components containing Doppler shift signals. Then, these signals are applied as the output signals of the mixers 15 and 1 to the Doppler shift signal detector 17. The signal of each channel is shunted into the "a" and "b" channels. The rasters L1 and L2 are displayed in the directions of addresses as preset on a single blood stream. The sample volumes SV1 and SV2 are set on the rasters L1 and L2. As a result, the Doppler shift signals of the depths of the sample volumes SV1 and SV2 are detected. When the sample volumes SV1 and SV2 are set on the rasters L1 and L2, the coordinates are set up. A line connecting both the coordinates indicates the direction of the blood stream. Succeedingly, the angle calculating circuit 27 calculates an angle $\theta$ between the blood stream direction and one of the rasters by using the data of the coordinates. The detect position of the blood stream direction is constantly tracked by the automatic tracking function. When it is changed, the change is detected, and immediately control is made so as to shift the sample volumes SV1 and SV2 to the changed positions. At this time, correction of the angle $\theta$ is also performed automatically. The angle $\theta$ correction is automatically even if the blood stream direction changes. Therefore, there is no need for intricate operation to detect the blood stream information.

To independently display the two rasters L1 and L2 on a single blood stream, the rasters L1 and L2 are alternately scanned by a rate signal PRF (pulse repetition frequency). By this, a range of detecting a velocity of the blood stream is between $(\frac{1}{4})$PRF and $(-\frac{1}{4})$PRF. If one desires to obtain only a Doppler image (blood stream velocity), the detecting range may be expanded to a range between $(\frac{1}{2})$PRF to $(-\frac{1}{2})$PRF. In this case, however, the automatic correction of the angle $\theta$ is impossible. Accordingly, the blood stream direction must be tracked by it is switched to the two channels, "a" and "b" channels every fixed period (e.g., 5 sec.).

Apparently, it is possible to detect or measure various types of the blood stream information, such as maximum flow velocity, average flow velocity, pulsatility index, pressure drop, and velocity slope, in addition to the blood stream velocity.

Figure 10:
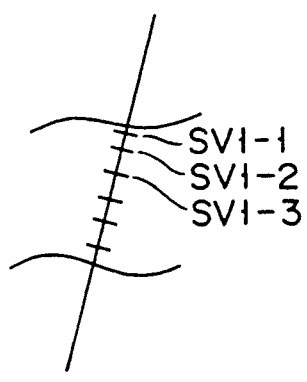
FIG. 10 is an explanatory diagram for explaining that a plurality of sample volumes can be selected on one raster crossing a blood stream.

In a vessel where a blood stream is thick, heart cavities, and the like, it is often impossible to decide the center of blood stream. In such a case, a plurality of sample volumes SV1-1, SV1-2, SV1-3, ... are set on one raster, as shown in FIG. 10. And a position where a high blood stream velocity exists is selected. In this way, the direction of the blood stream may be finely obtained.

The automatic tracking can readily be realized by changing the positions of the sample volumes and the phase of a reference lock in accordance with body motion and pulsation when a motion of the wall of vessel is used as a reference point.

Figure 11:
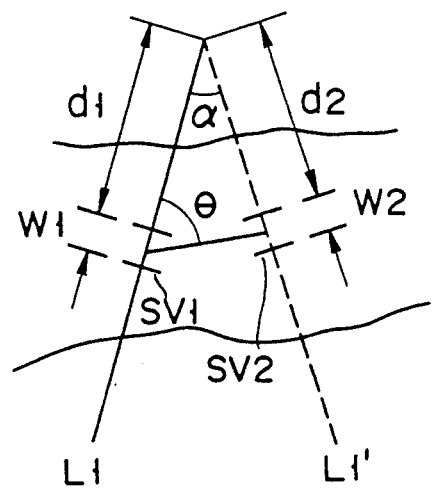
FIG. 11 is an explanatory diagram for explaining an operation to set sample volumes SV1 and SV2 on the first and second rasters shown in FIG. 6.

Another embodiment of the present invention will be described with reference to FIGS. 11 and 12. In the instant embodiment, after an operator manually sets the sample volume SV1 on the first raster L1, another sample volume SV2 is automatically positioned without setting the second raster L2 upstream or downstream of the blood stream.

Figure 12:
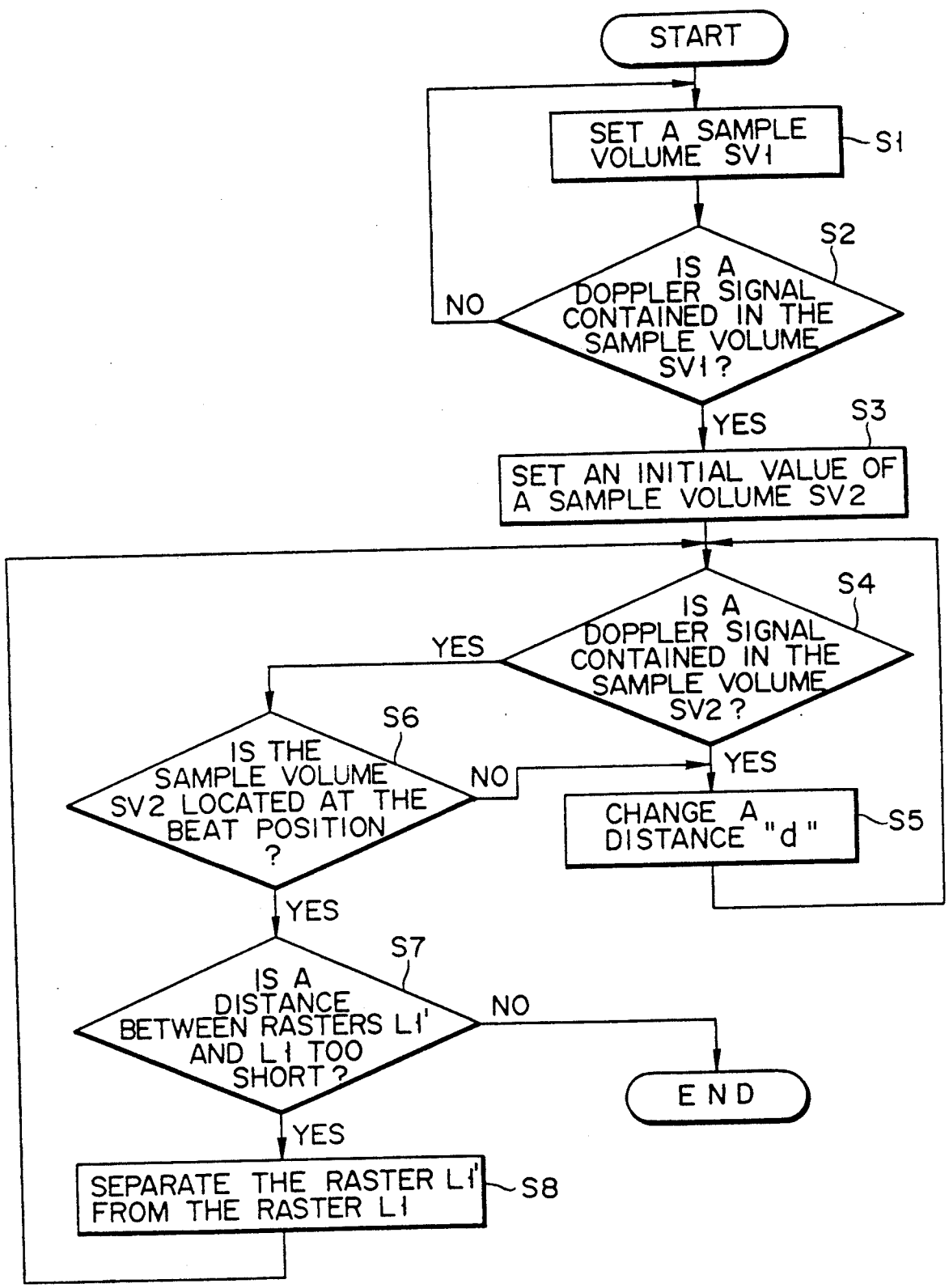
FIG. 12 is a flowchart showing an operation to automatically set a sample volume SV2 in FIG. 9.

An operator first positions a sample volume SV1 on the raster L1 on a blood stream in step S1 in FIG. 12. In the next step S2, control checks if a Doppler signal is contained in the sample volume SV1. If the answer is YES, control goes to step S3. In this step, an angle $\alpha$ between the raster L1 and a line L1' connecting a beam original and a sample volume SV2 as a target is varied to change a distance d1 from the beam original to another distance d2, and the width W1 of the sample volume SV1 to the width W2 of the sample volume SV2, while tracking the target. An initial value of the angle $\alpha$, for example, is set through the operations of the controllers 26 and 33 shown in FIG. 4. Specifically, the controllers 26 and 33, upon receipt of the sample volume SV1, for example, gradually increases the angle $\alpha$ from 1° to about 10° to set an initial value of the angle $\alpha$, and set an initial value of the sample volume SV2, together with the distance "d" and the width "W2". Then, control goes to step S4 where it decides if a Doppler signal is contained in the sample volume SV2. If the answer is NO, the distance "d" is changed in step S5. And control checks if a Doppler signal is contained in the sample volume SV2 at a new distance "d". If the answer is YES, control goes to step S6 where it checks if the sample volume SV2 is at the best position. Specifically, it checks if the sample volume SV2 is oriented in the same direction as that of the sample volume SV1 on the single raster, or if it is positioned at the center of the blood stream. If it is not at the best position, control goes to step S5 where the distance "d" is changed and a new sample volume SV2 is set. If it is at the best position, it is checked that the distance between the line L1' and the raster L1 is too short, that is, the angle $\alpha$ is too small. This is done in step S7. If the answer is NO, control decides that the present position of the sample volume SV2 on the line L1' is the best position, and sets the position as the best position. If the answer is YES, the rasters L1 and L1' is separated from each other. Then, control returns to step S4 repeats the decision on a new sample volume SV2.

As described above, the sample volume SV2 on the raster L1' may be set manually or automatically by an operator. The sample volumes SV1 and SV2 may be set at substantially the equal depths from the surface of a human body.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. An ultrasonic Doppler diagnosis apparatus comprising:
   raster setting means for setting addresses of ultrasonic rasters oriented in arbitrary directions on an image of a blood stream of an object to be diagnosed, said addresses defining first and second rasters by arbitrary angles, and said ultrasonic rasters being obtained by an ultrasonic probe for transmitting and receiving an ultrasonic beam to and from said object;
   means for setting positions of sample volumes respectively corresponding to depths as measured from the surface of said object on said first and second rasters as set by said raster setting means;
   Doppler shift signal detecting means for detecting two types of Doppler shift signals respectively corresponding to the positions of the sample volumes as set on said first and second rasters; and
   angle detecting means for automatically detecting an angle between a line connecting the positions of the sample volumes as said first and second rasters and one of said first and second rasters on said blood stream image, in order to obtain information on a blood stream.

2. The ultrasonic Doppler diagnosis apparatus according to claim 1, in which said Doppler shift signal detecting means receives two phase detect signals that are obtained by mixing echo signals with reference signals, said echo signals being obtained by shunting an input echo signal into two channels in order to detect the blood stream information in a forward direction and a reverse direction, and detects two Doppler shift signals.

3. An ultrasonic Doppler diagnosis apparatus comprising:
   raster setting means for setting addresses of a first ultrasonic raster on an image of a blood stream of an object to be diagnosed, said first raster being obtained by an ultrasonic probe for transmitting and receiving an ultrasonic beam to and from said object;
   means for setting positions of sample volumes respectively corresponding to depths as measured from the surface of said object on said first raster as set by said raster setting means;
   means for setting a second sample volume at the depth substantially equal to that of said first sample volume by setting an initial value of a desired position upstream for downstream of said blood stream;
   Doppler signal detecting means for detecting two types of Doppler signals respectively corresponding to said two sample volumes as set; and
   angle detect means for automatically detecting an angle between a line connecting said two sample volumes as set on said first and said second rasters and said raster, and blood stream information.

4. The ultrasonic Doppler diagnosis apparatus according to claim 3, in which said set initial value is an angle $\alpha$ between said first and second raster lines, and said second sample volume.

* * * * *